US010393055B2

(12) United States Patent
Morris et al.

(10) Patent No.: US 10,393,055 B2
(45) Date of Patent: Aug. 27, 2019

(54) METHODS AND SYSTEMS FOR FUEL INJECTION CONTROL

(71) Applicant: Ford Global Technologies, LLC, Dearborn, MI (US)

(72) Inventors: Nathan Morris, Canton, MI (US); Mark Richard Skilling, Tonbridge (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/216,086

(22) Filed: Dec. 11, 2018

(65) Prior Publication Data

US 2019/0107074 A1 Apr. 11, 2019

Related U.S. Application Data

(62) Division of application No. 16/054,013, filed on Aug. 3, 2018, now Pat. No. 10,184,416, which is a division
(Continued)

(51) Int. Cl.

| | |
|---|---|
| ***B60T 7/12*** | (2006.01) |
| ***F02D 41/30*** | (2006.01) |
| ***F02D 41/00*** | (2006.01) |
| ***F02M 53/04*** | (2006.01) |
| ***F02M 57/00*** | (2006.01) |
| ***F02M 63/02*** | (2006.01) |
| ***F02M 65/00*** | (2006.01) |

(Continued)

(52) U.S. Cl.
CPC ....... *F02D 41/3094* (2013.01); *F02D 35/027* (2013.01); *F02D 41/0087* (2013.01); *F02M 53/043* (2013.01); *F02M 57/005* (2013.01); *F02M 63/0205* (2013.01); *F02M 63/0225* (2013.01); *F02M 65/001* (2013.01); *F02D 19/022* (2013.01); *F02D 2200/021* (2013.01); *F02D 2200/0606* (2013.01)

(58) Field of Classification Search
CPC ............ F02B 19/1085; F02D 35/0046; F02D 41/0025; F02D 31/00; F02D 31/007; F02D 17/02; F02D 41/0087; B60W 2030/206
USPC ........................ 701/103–105, 110, 112, 113; 123/319–322, 325, 326, 430, 491
See application file for complete search history.

(56) References Cited

U.S. PATENT DOCUMENTS 4,945,880 A * 8/1990 Gonze ................ F02D 41/0025 123/1 A
9,322,340 B2 4/2016 VanDerWege et al.
(Continued)

FOREIGN PATENT DOCUMENTS

CA 2809298 A1 5/2013

*Primary Examiner* — John Kwon
(74) *Attorney, Agent, or Firm* — Julia Voutyras; McCoy Russell LLP

(57) ABSTRACT

Methods and systems are provided for continuously estimating a direct injector tip temperature based on heat transfer to the injector from the cylinder due to combustion conditions, and heat transfer to the injector due to flow of cool fuel from the fuel rail. Variations in the injector tip temperature from a steady-state temperature are monitored when the direct injector is deactivated. Upon reactivation, a fuel pulse width commanded to the direct injector is updated to account for a temperature-induced change in fuel density, thereby reducing the occurrence of air-fuel ratio errors.

9 Claims, 7 Drawing Sheets

Related U.S. Application Data of application No. 15/362,513, filed on Nov. 28, 2016, now Pat. No. 10,066,570.

(51) Int. Cl.

| | |
|---|---|
| ***F02D 35/02*** | (2006.01) |
| *F02D 19/02* | (2006.01) |

(56) References Cited

U.S. PATENT DOCUMENTS

| | | | |
|---|---|---|---|
| 2007/0131196 | A1 | 6/2007 | Gibson et al. |
| 2008/0262695 | A1 | 10/2008 | Gibson et al. |
| 2013/0054115 | A1 | 2/2013 | Chen et al. |
| 2017/0356364 | A1 | 12/2017 | Glugla |
| 2017/0356367 | A1 | 12/2017 | Glugla |
| 2017/0356368 | A1 | 12/2017 | Richards et al. |
| 2017/0356374 | A1 | 12/2017 | Rollinger et al. |
| 2018/0149107 | A1* | 5/2018 | Morris .................. F02D 35/027 |
| 2018/0328304 | A1* | 11/2018 | Pursifull ............. F02D 41/2467 |
| 2018/0328306 | A1* | 11/2018 | Pursifull ............. F02D 41/3845 |

* cited by examiner

500

502

506

| | 0 | 0.2 | 0.4 | 0.6 | 0.8 | 1.2 |
|---|---|---|---|---|---|---|
| 6000 | 0.8,0.2 | 0.8,0.2 | 0.8,0.2 | 0.8,0.2 | 0.8,0.2 | 0.8,0.2 |
| 5000 | 0.6,0.4 | 0.2,0.8 | 0.3,0.7 | 0.4,0.6 | 0.5,0.5 | 0.6,0.4 |
| 4000 | 0.3,0.7 | 0.1,0.9 | 1.0 | 0.2,0.8 | 0.2,0.8 | 0.3,0.7 |
| 3000 | 0.3,0.7 | 0.2,0.8 | 0,1 | 0,1 | .05,.95 | 1.0 |
| 2000 | 0.7,0.3 | 0.4,0.6 | 0,1 | 0,1 | 0,1 | 0.1,0.9 |
| 1000 | 0.9,0.1 | 0.7,0.3 | 0.5,0.5 | 0.3,0.7 | 0.2,0.8 | 0.1,0.9 |
| 0 | 1,0 | 0.8,0.2 | 0.8,0.2 | 0.5,0.5 | 0.2,0.8 | 0.2,0.8 |

504

ENGINE LOAD

FIG. 5

METHODS AND SYSTEMS FOR FUEL INJECTION CONTROL

CROSS REFERENCE TO RELATED APPLICATIONS

The present application is a divisional of U.S. patent application Ser. No. 16/054,013, entitled "METHODS AND SYSTEMS FOR FUEL INJECTION CONTROL," filed on Aug. 3, 2018. U.S. patent application Ser. No. 16/054,013 is a divisional of U.S. patent application Ser. No. 15/362,513, entitled "METHODS AND SYSTEMS FOR FUEL INJECTION CONTROL," filed on Nov. 28, 2016, now U.S. Pat. No. 10,066,570. The entire contents of the above-referenced applications are hereby incorporated by reference in their entirety for all purposes.

FIELD

The present application relates generally to systems and methods for adjusting operation of fuel injectors of an internal combustion engine to compensate for temperature variations.

BACKGROUND/SUMMARY

Engines may be configured to deliver fuel to an engine cylinder using one or more of port and direct injection. Port fuel direct injection (PFDI) engines are capable of leveraging both fuel injection systems. For example, at high engine loads, fuel may be directly injected into an engine cylinder via a direct injector, thereby leveraging the charge cooling properties of the direct injection (DI). At lower engine loads and at engine starts, fuel may be injected into an intake port of the engine cylinder via a port fuel injector, reducing particulate matter emissions. During still other conditions, a portion of fuel may be delivered to the cylinder via the port injector while a remainder of the fuel is delivered to the cylinder via the direct injector.

During engine operation with direct injection enabled, fuel flow through the direct injector nozzle maintains the direct injector tip temperatures substantially lower (e.g., around 100° C.). In comparison, during periods of engine operation where direct injection is disabled and no fuel is being released by the direct injector (e.g., during conditions where only port injection of fuel is scheduled), the direct injector tip temperature may become substantially higher (e.g., around 260° C.). When fuel is subsequently injected from the direct injector, the fuel may be at the elevated temperature, and therefore at a lower density than expected, resulting in unintended fueling errors. For example, due to less fuel being delivered than intended, the direct injection can result in a lean air-fuel ratio error. In one example, when the injector temperature rises by 80° C., a 4% lean error is created.

One example approach for compensating for an elevated direct injector tip temperature is shown by VanDerWege et al. in U.S. Pat. No. 9,322,340. Therein, responsive to an elevated temperature of a knock control fluid at a time of release from a direct injector, a pulse width of the injection is adjusted. In particular, a longer direct injection pulse width is applied as the predicted temperature of the fuel at the time of release from the direct injector increases.

However the inventors herein have recognized potential issues with the above approach. As one example, even with the adjustment of '340, fueling errors may persist due to differences in the behavior of the fuel temperature and tip temperature over the duration of direct injector deactivation, as well as during the subsequent direct injection. For example, heat transfer to the direct injector over the period of deactivation may differ based on whether cylinder combustion continued via port injection, average cylinder load if cylinder combustion did continue, whether all cylinder combustion was stopped, whether air continued to be pumped through the cylinder when combustion was stopped due to selective fuel deactivation without valve deactivation, whether both the fuel injector and the valves were deactivated when combustion was stopped, whether the engine was still spinning when combustion was stopped, etc. Some of these factors may also have an effect on the fuel temperature, albeit different from the effect on the direct injector tip temperature. In still another example, when the direct injector is reactivated and fuel is released therefrom, the injector tip temperature may cool at a faster rate than the fuel temperature. As a result of these variation, if the direct injection of knock control fluid is corrected to compensate for the elevated temperature of the fuel at the time of release, the density change may be overestimated. The pulse width of the direct injection may be increased more than required (or longer than required), resulting in a rich air-fuel ratio error. Alternatively, the density change may be underestimated with the pulse width of the direct injection increased less than required (or shorter than required), resulting in a lean air-fuel ratio error. As yet another example, in the approach of '340, the fuel temperature is calculated based on an inferred fuel rail temperature. However, during engine transients, the fuel rail temperature may remain stable. This causes the calculated fuel temperature to be held substantially constant while the actual fuel temperature increases.

In one example, some of the above issues may be addressed by a method for an engine comprising: responsive to deactivation of a direct injector, estimating a direct injector tip temperature different from fuel temperature based on cylinder conditions including cylinder combustion conditions, cylinder valve operation, and port injector operation during the deactivation; and responsive to reactivation of the direct injector, adjusting a direct injection fuel pulse based on each of the estimated direct injector tip temperature and fuel temperature. In this way, direct injection fueling errors can be reduced.

As an example, an engine may be configured with both port and direct injection capabilities. During engine operation, including during cylinder combusting and cylinder non-combusting conditions, an engine controller may continuously estimate a direct injector tip temperature different from a fuel temperature. The fuel temperature may be estimated via a fuel rail temperature sensor. The direct injector tip temperature may be determined as a function of heat flow into the direct injector (such as due to combustion heat when cylinder combustion is enabled) as well as cooling flow into the direct injector (such as due to fuel being replenished at the injector). As such, the heat flow and cooling flow estimates may vary based on multiple combustion parameters such as whether the direct injector is activated or not, whether cylinder combustion via port injection is continuing or not when the direct injector is deactivated, whether cylinder valves are operating or not when the direct injector is deactivated and the cylinder is not combusting, average cylinder load when the direct injector is deactivated and the cylinder is combusting, duration of direct injector deactivation, etc. The controller may determine a steady-state direct injector tip temperature when direct injection is enabled and then monitor a transient change in the direct injector tip temperature while direct injection is disabled. As such, the fuel temperature may fluctuate less dramatically than the tip temperature. The controller may concurrently determine a fuel density correction factor based on the tip temperature relative to the fuel temperature, and apply the correction factor to a nominal fuel density estimate so that fluctuations in the fuel density can be monitored in real-time. At the time of reactivation of the direct injector, the controller may adjust a direct injection pulse-width based on the corrected fuel density estimate. For example, at a time of direct injector reactivation after a period of DI deactivation where cylinders continued to receive fuel from the port injectors and combust, the DI tip temperature may have risen above the steady-state temperature. Accordingly, the controller may compensate for a drop in fuel density by increasing the fuel pulse-width by a larger amount. In comparison, at a time of direct injector reactivation after a period of DI deactivation where cylinders did not combust but air continued to be pumped through the valves (e.g., a DFSO event), the DI tip temperature may have fallen below the steady-state temperature. Accordingly, the controller may compensate for a rise in fuel density by increasing the DI fuel pulse-width by a smaller amount, or by decreasing the DI fuel pulse-width. In addition, the pulse-width may be varied over a duration since the reactivation with a time constant that is based on the transient change in tip temperature.

In this way, fuel injection settings of a direct injector may be adjusted to compensate for changes in fuel density due to different degrees of heating of the fuel and the injector tip over a duration of direct injector disablement. The technical effect of compensating for the rate of change in fuel temperature differently from the rate of change in tip temperature is that the different temperature profiles may be accounted for when direct injection is re-enabled. By continuously estimating a direct injector tip temperature based on variations in heat flow and cooling flow to the injector, temperature-induced changes in fuel density can be more accurately estimated and an injection pulse-width can be appropriately adjusted without incurring (lean or rich) air-fuel ratio excursions. In addition, the charge cooling effect of the direct injected fuel can be better leveraged. Furthermore, direct injector fouling and thermal degradation can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows an example table of empirically determined port and direct fuel fractions (DI/PFI split ratio).

DETAILED DESCRIPTION

The following description relates to systems and methods for adjusting operation of a direct fuel injector of an internal combustion engine following a period of deactivation to compensate for a change in density of the injected fuel with temperature. An example embodiment of a hybrid vehicle system having an engine cylinder configured with each of a direct injector and a port injector is given in FIG. 1. FIG. 2 depicts an example fuel system that may be used with the engine system of FIG. 1. A split ratio of fuel to be delivered via port injection relative to direct injection may be determined based an engine operating conditions, such as using the engine speed-load table of FIG. 5. During certain engine operating conditions, fuel may be delivered to the engine via port injection only and the direct injectors may be disabled. During prolonged period of deactivation of the direct injectors, temperature may build up at the direct injector, the direct injection fuel rail, and consequently at the fuel to be delivered via the direct injector. An engine controller may perform a routine, such as the example routine of FIG. 3, to continuously estimate a direct injector tip temperature different from a fuel temperature and correct a fuel density based on the estimations. The controller may rely on a model, such as the example model of FIG. 4 to estimate the DI tip temperature change. For example, the controller may compare heat flow and cooling flow to the direct injector over engine combusting and non-combusting conditions to determine a net heat flow to the injector tip, as elaborated with reference to the example of FIG. 6. A fuel injection pulse-width may then be corrected to compensate for a change in the fuel density induced by the net heat flow to the injector, as illustrated with reference to FIG. 7. In this way, fueling errors during direct injector enablement following a duration of direct injector disablement may be reduced and thermal damage to fuel system components may be averted.

Regarding terminology used throughout this detailed description, a high pressure pump, or direct injection pump, may be abbreviated as HPP. Similarly, a low pressure pump, or lift pump, may be abbreviated as a LPP. Port fuel injection may be abbreviated as PFI while direct injection may be abbreviated as DI. Also, fuel rail pressure, or the value of pressure of fuel within a fuel rail, may be abbreviated as FRP.

Figure 1:
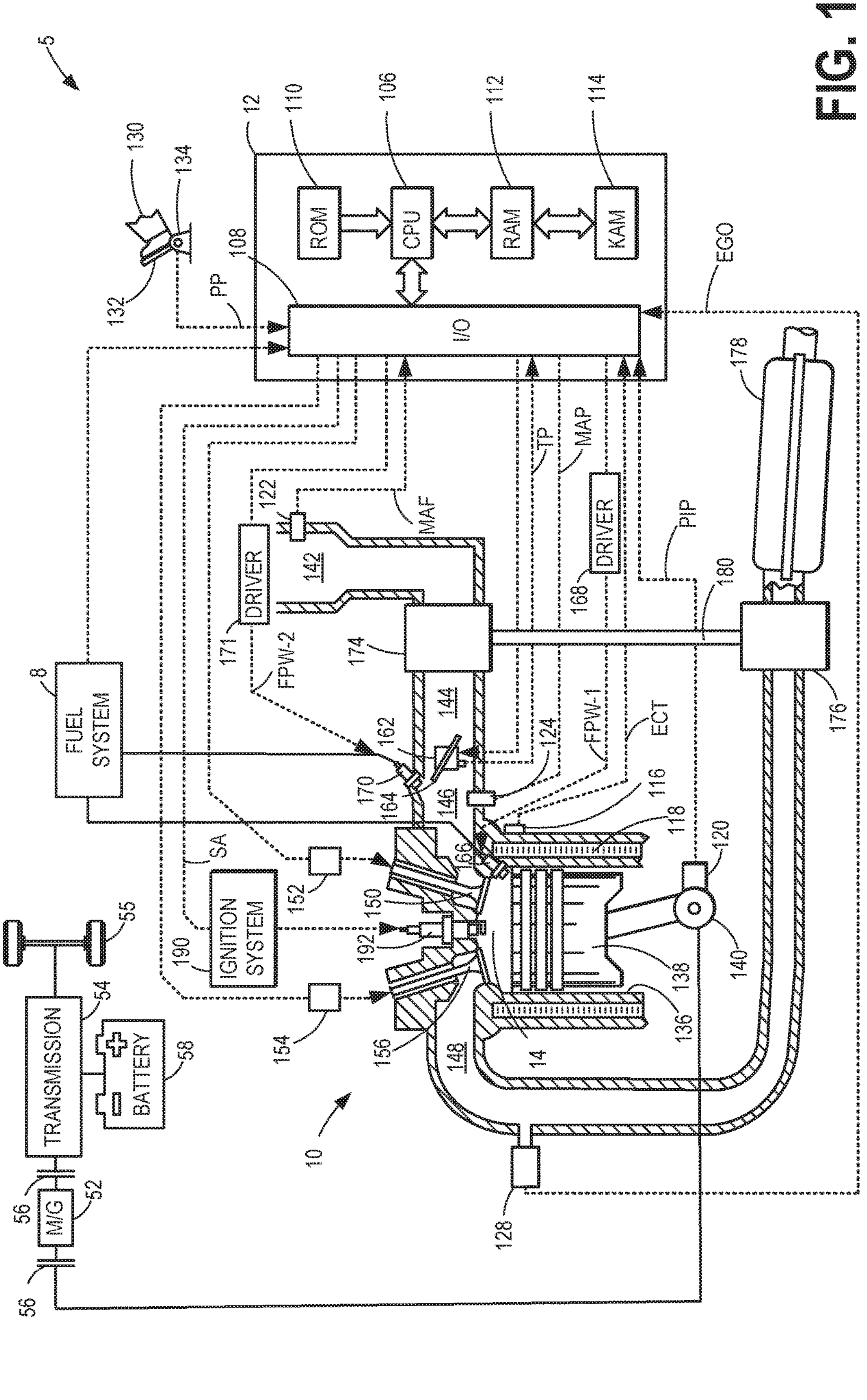
FIG. 1 schematically depicts an example embodiment of a cylinder of an internal combustion engine coupled in a hybrid vehicle system.
Figure 2:
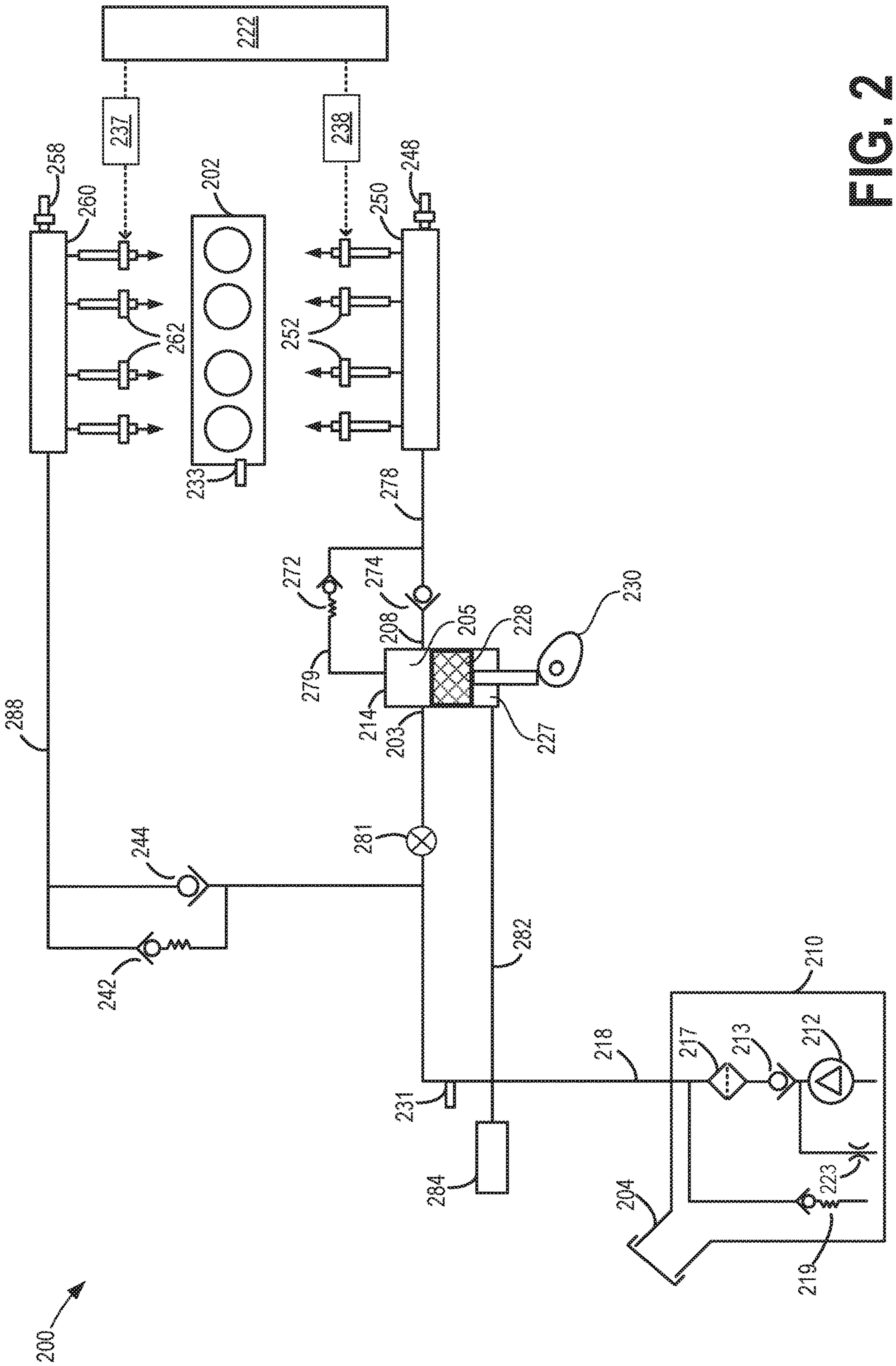
FIG. 2 schematically depicts an example embodiment of a fuel system, configured for port injection and direct injection that may be used with the engine of FIG. 1.

FIG. 1 depicts an example of a combustion chamber or cylinder of internal combustion engine 10. Engine 10 may be coupled in a propulsion system for on-road travel, such as vehicle system 5. In one example, vehicle system 5 may be a hybrid electric vehicle system.

Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIG. 2, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller. For example, based on a pulse-width signal commanded by the controller to a driver coupled to the direct injector, a fuel pulse may be delivered from the direct injector into a corresponding cylinder.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

FIG. 2 schematically depicts an example embodiment 200 of a fuel system, such as fuel system 8 of FIG. 1. Fuel system

200 may be operated to deliver fuel to an engine, such as engine 10 of FIG. 1. Fuel system 200 may be operated by a controller to perform some or all of the operations described with reference to the method of FIG. 3.

Fuel system 200 includes a fuel storage tank 210 for storing the fuel on-board the vehicle, a lower pressure fuel pump (LPP) 212 (herein also referred to as fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by a controller 222 (e.g., controller 12 of FIG. 1) to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212. As one example, the electrical power supplied to the lower pressure pump motor can be obtained from an alternator or other energy storage device on-board the vehicle (not shown), whereby the control system can control the electrical load that is used to power the lower pressure pump. Thus, by varying the voltage and/or current provided to the lower pressure fuel pump, the flow rate and pressure of the fuel provided at the inlet of the higher pressure fuel pump 214 is adjusted.

LPP 212 may be fluidly coupled to a filter 217, which may remove small impurities contained in the fuel that could potentially damage fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. Solenoid valve 281 located upstream of inlet 203 governs the fuel quantity that is compressed. HPP 214 may then deliver fuel into a first fuel rail 250 coupled to one or more fuel injectors of a first group of direct injectors 252 (herein also referred to as a first injector group). Fuel lifted by the LPP 212 may also be supplied to a second fuel rail 260 coupled to one or more fuel injectors of a second group of port injectors 262 (herein also referred to as a second injector group). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 for each cylinder of the engine while second fuel rail 260 may dispense fuel to one fuel injector of second injector group 262 for each cylinder of the engine. Controller 222 can individually actuate each of the port injectors 262 via a port injection driver 237 and actuate each of the direct injectors 252 via a direct injection driver 238. The controller 222, the drivers 237, 238 and other suitable engine system controllers can comprise a control system. While the drivers 237, 238 are shown external to the controller 222, it should be appreciated that in other examples, the controller 222 can include the drivers 237, 238 or can be configured to provide the functionality of the drivers 237, 238. Controller 222 may include additional components not shown, such as those included in controller 12 of FIG. 1.

HPP 214 may be an engine-driven, positive-displacement pump. As one non-limiting example, HPP 214 may be a BOSCH HDP5 HIGH PRESSURE PUMP, which utilizes a solenoid activated control valve (e.g., fuel volume regulator, magnetic solenoid valve, etc.) to vary the effective pump volume of each pump stroke. The outlet check valve of HPP is mechanically controlled and not electronically controlled by an external controller. HPP 214 may be mechanically driven by the engine in contrast to the motor driven LPP 212. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 222. Step room 227 may also be directly coupled to fuel passage 218 via fuel line 282. An accumulator 284 may be coupled at the node.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump. Readings from sensor 231 may be used to assess the operation of various components in fuel system 200, to determine whether sufficient fuel pressure is provided to higher pressure fuel pump 214 so that the higher pressure fuel pump ingests liquid fuel and not fuel vapor, and/or to minimize the average electrical power supplied to lift pump 212.

First fuel rail 250 includes a first fuel rail pressure sensor 248 for providing an indication of direct injection fuel rail pressure to the controller 222. Likewise, second fuel rail 260 includes a second fuel rail pressure sensor 258 for providing an indication of port injection fuel rail pressure to the controller 222. An engine speed sensor 233 can be used to provide an indication of engine speed to the controller 222. The indication of engine speed can be used to identify the speed of higher pressure fuel pump 214, since the pump 214 is mechanically driven by the engine 202, for example, via the crankshaft or camshaft.

First fuel rail 250 is coupled to an outlet 208 of HPP 214 along fuel passage 278. A check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 are disabled. In another example, during mid-load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 are disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, pump duty cycle command and/or fuel flow rate of the fuel pumps to deliver fuel to different locations of the fuel system. A driver (not shown) electronically coupled to controller 222 may be used to send a control signal to the low pressure pump, as required, to adjust the output (e.g., speed, flow output, and/or pressure) of the low pressure pump.

Since fuel injection from the direct injectors results in injector cooling, following a period of inactivity, pressure may build up from fuel trapped at the DI fuel rail 250, resulting in an elevated temperature and pressure being experienced at the DI fuel rail 250. In addition, direct injector tip temperatures may start to rise. If the DI injector tip rises above a threshold, where thermal degradation and fouling of the injector can occur (a.k.a. coking), the direct injector may need to be cooled to prevent damage to fuel system components. In one example, while only port injection is enabled, the direct injector may be intermittently operated to release enough fuel to cool the direct injector tip temperature to within a permissible temperature range. The rise in injector tip temperature may also affect the density of the fuel released during direct injection. When direct injection is performed for knock control or charge cooling (such as when a fuel is direct injected after a duration of operation with only port injection), the charge cooling efficiency of the direct injection may be reduced at the elevated fuel and tip temperature due to the decrease in a heat of vaporization of the fuel with increasing temperature. In addition, due to the change in fuel density, the mass of fuel released at a given fuel pulse-width may drop, resulting in a lean air-fuel ratio excursion.

The inventors herein have recognized that the DI tip temperature may vary based on multiple parameters. Specifically, the net heat transferred to the injector tip varies with the presence or absence of combustion heat, fuel flow cooling, air flow cooling, etc. As an example, when direct injection is deactivated but cylinder combustion continues, more combustion heat may be transferred to the injector tip than cooling flow from fuel replenishment, resulting in a higher tip temperature. As another example, when direct injection is deactivated and cylinder combustion is stopped, but valve operation is not discontinued, less combustion heat is transferred to the injector tip while more cooling flow is transferred due to injector fuel replenishment as well as due to air being pumped through the cylinder. This can result in a lower tip temperature. As yet another example, when direct injection is deactivated and cylinder combustion is stopped, and valve operation is discontinued, less cooling flow is transferred resulting in a net heating of the injector tip. In each situation, fuel temperature at the fuel rail may remain substantially stable, or change differently from the change in the tip temperature. To more accurately compensate for the DI tip temperature drifts and the temperature-induced fuel density change, the controller may continuously estimate the DI tip temperature based on various operating conditions including heat transfer to the direct injector in the presence and absence of combustion, cooling flow to the direct injector due to the presence or absence of fuel flow as well as due to fuel temperature, and cooling flow to the direct injector due to airflow through the cylinder. Consequently, the controller may have a more accurate estimate of an instantaneous direct injector tip temperature. As elaborated herein with reference to FIG. 3, to reduce the occurrence of air-fuel ratio excursions when direct injection is enabled after a period of deactivation, a pulse-width commanded to the direct injector may be adjusted based on the instantaneous estimate of the direct injector tip temperature. In one example, the DI fuel system temperature change, and the corresponding change in fuel density may be estimated by the engine controller using an algorithm or model, such as the example model of FIG. 4, or via the plots of FIG. 6. In particular, by adjusting a DI fuel pulse following DI reactivation to account for the difference in injector tip temperature change relative to fuel temperature change over the period of DI deactivation, the charge cooling benefits of the DI injection can be provided without unintentionally enleaning or enriching the air-fuel ratio.

In this way, the system of FIGS. 1-2 enables an engine system comprising an engine cylinder including intake valve and an exhaust valve; a direct fuel injector for delivering fuel directly into the engine cylinder; a port fuel injector for delivering fuel into an intake port, upstream of the intake valve of the engine cylinder; a fuel rail providing fuel to each of the direct and port fuel injector; a temperature sensor coupled to the fuel rail; and a controller. The controller may be configured with computer readable instructions stored on non-transitory memory for: deactivating the direct fuel injector; in response to direct injector reactivation after a duration of engine fueling via port injection only, increasing a commanded direct injection fuel pulse-width; and in response to direct injector reactivation after a duration of no engine fueling, decreasing the commanded direct injection fuel pulse-width. In one example, a rate of the increasing may be raised as one or more of engine speed, engine load, spark timing retard, estimated fuel rail temperature, and duration of engine fueling increases. In another example, a rate of the decreasing may be raised responsive to one or more of the intake and exhaust valve remaining active during the duration of no engine fueling, and an increase in the duration of no engine fueling. The controller may include further instructions for estimating a fuel flow rate into the deactivated direct injector; and as the estimated fuel flow rate increases, reducing the rate of increasing in response to direct injector reactivation after the duration of engine fueling via port injection only; and raising the rate of decreasing in response to direct injector reactivation after the duration of no engine fueling.

Figure 3:
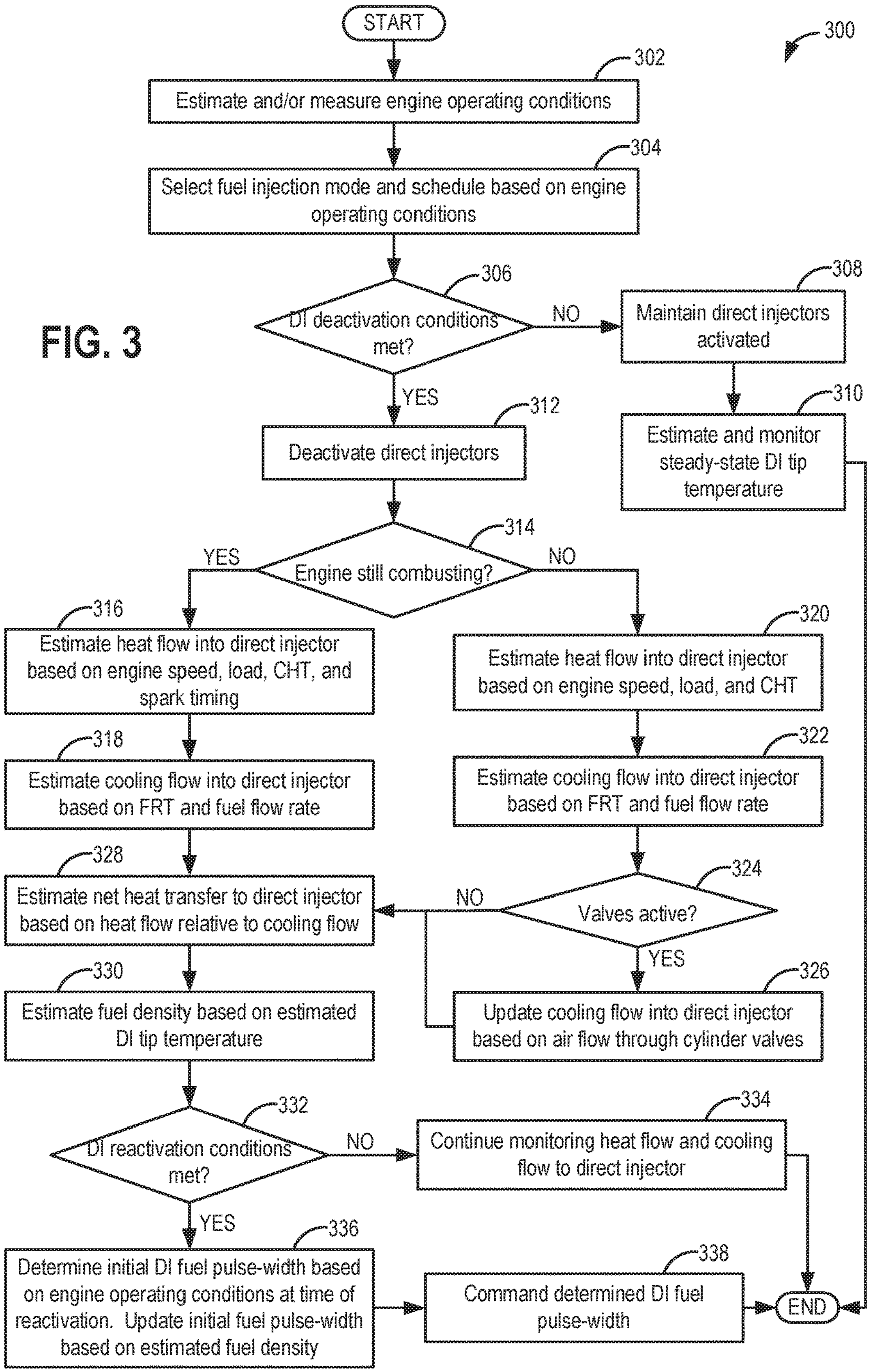
FIG. 3 shows a flow chart illustrating an example method that may be implemented for adjusting a direct injection pulse-width at a time of injector reactivation.

Turning now to FIG. 3, an example method 300 is shown for reducing air-fuel excursions resulting from changes in fuel density with increasing temperature when a direct injection system is disabled. Instructions for carrying out method 300 and the rest of the methods included herein may be executed by a controller based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

At 302, engine operating conditions may be determined by the controller. The engine operating conditions may include engine load, engine temperature, engine speed, operator torque demand, etc. Depending on the estimated operating conditions, a plurality of engine parameters may be determined. For example, at 304, a fuel injection schedule may be determined. This includes determining an amount of fuel to be delivered to a cylinder (e.g., based on the torque demand), as well as a fuel injection timing. Further, a fuel injection mode and a split ratio of fuel to be delivered via port injection relative to direct injection may be determined for the current engine operating conditions. In one example, at high engine loads, direct injection (DI) of fuel into an engine cylinder via a direct injector may be selected in order to leverage the charge cooling properties of the DI so that engine cylinders may operate at higher compression ratios without incurring undesirable engine knock. If direct injection is selected, the controller may determine whether the fuel is to be delivered as a single injection or split into multiple injections, and further whether to deliver the injection(s) in an intake stroke and/or a compression stroke. In another example, at lower engine loads (low engine speed) and at engine starts (especially during cold-starts), port injection (PFI) of fuel into an intake port of the engine cylinder via a port fuel injector may be selected in order to reduce particulate matter emissions. If port injection is selected, the controller may determine whether the fuel is to be delivered during a closed intake valve event or an open intake valve event. There may be still other conditions where a portion of the fuel may be delivered to the cylinder via the port injector while a remainder of the fuel is delivered to the cylinder via the direct injector. Determining the fuel injection schedule may also include, for each injector, determining a fuel injector pulse-width as well as a duration between injection pulses based on the estimated engine operating conditions.

In one example, the determined fuel schedule may include a split ratio of fuel delivered via port injection relative to direct injection, the split ratio determined from a controller look-up table, such as the example table of FIG. 5. With reference to FIG. 5, a table 500 for determining port and direct fuel injector fuel fractions for a total amount of fuel supplied to an engine during an engine cycle is shown. The table of FIG. 5 may be a basis for determining a mode of fuel system operation (DI only, PFI only, or PFI and DI combined (PFDI)), as elaborated in the method of FIG. 3. The vertical axis represents engine speed and engine speeds are identified along the vertical axis. The horizontal axis represents engine load and engine load values are identified along the horizontal axis. In this example, table cells 502 include two values separated by a comma. Values to the left sides of the commas represent port fuel injector fuel fractions and values to the right sides of commas represent direct fuel injector fuel fractions. For example, for the table value corresponding to 2000 RPM and 0.2 load holds empirically determined values 0.4 and 0.6. The value of 0.4 or 40% is the port fuel injector fuel fraction, and the value 0.6 or 60% is the direct fuel injector fuel fraction. Consequently, if the desired fuel injection mass is 1 gram of fuel during an engine cycle, 0.4 grams of fuel is port injected fuel and 0.6 grams of fuel is direct injected fuel. In other examples, the table may only contain a single value at each table cell and the corresponding value may be determined by subtracting the value in the table from a value of one. For example, if the 2000 RPM and 0.2 load table cell contains a single value of 0.6 for a direct injector fuel fraction, then the port injector fuel fraction is 1−0.6=0.4.

It may be observed in this example that the port fuel injection fraction is greatest at lower engine speeds and loads. In the depicted example, table cell 504 represents an engine speed-load condition where all the fuel is delivered via port injection only. At this speed-load condition, direct injection is disabled. The direct fuel injection fraction is greatest at middle level engine speeds and loads. In the depicted example, table cell 506 represents an engine speed-load condition where all the fuel is delivered via direct injection only. At this speed-load condition, port injection is disabled. The port fuel injection fraction increases at higher engine speeds where the time to inject fuel directly to a cylinder may be reduced because of a shortening of time between cylinder combustion events. It may be observed that if engine speed changes without a change in engine load, the port and direct fuel injection fractions may change.

Returning to FIG. 3, at 306, the routine includes determining if direct injection deactivation conditions have been met. In one example, DI deactivation conditions are confirmed if a port fuel injection-only (PFI-only) fueling mode has been selected based on the current engine operating conditions. Fuel delivery via only PFI may be requested, for example, during conditions of low engine load and low engine temperature, as well as during engine starts. In another example, DI deactivation conditions are confirmed when combustion is stopped, such as during a deceleration fuel shut-off event, during an engine idle-stop, and during an engine shutdown where the engine is spun to rest, unfueled.

If DI deactivation conditions are not met, such as when a direct injection-only (DI-only) fueling mode or a dual fueling mode (with both port and direct injection, PFDI) has been selected, the method moves to 308 wherein the routine includes maintaining the direct injectors activated. At 310, the method includes estimating and monitoring a steady-state DI tip temperature based on the combustion conditions. As detailed with reference to FIG. 6, the controller may continuously monitor conditions at the DI tip to estimate a steady-state DI tip temperature based on heat flow and cooling flow to the injector. The steady-state estimate provides the controller with a reference temperature relative to which temperature drifts, and corresponding fuel density drifts, during transient engine operation without direct injection, can be estimated.

As such, the injector tip temperature model may run continuously while the vehicle is in use. In particular, it may run irrespective of whether the DI injectors are in use or not. The temperature model may be initialized at vehicle start up. In some examples, the temperature may continue to be modeled even after the vehicle is shut down. For example, the controller may track a vehicle off time and use it as a factor in estimating an initial tip temperature when the vehicle is subsequently turned on.

If DI deactivation conditions are met, at 312, the method includes deactivating the direct injectors. At 314, it may be determined if the engine is still combusting. That is, it may be determined if the engine is operating with only port injection while direct injection is disabled, or if all engine combustion has been temporarily suspended. The controller may then proceed to estimate a direct injector tip temperature different from a fuel temperature at the direct injector based on cylinder conditions including cylinder combustion conditions and cylinder valve operation. The controller may compare the combustion heat flow relative to a fuel replenishment cooling flow into the direct injector over a period of deactivation to infer an instantaneous direct injector tip temperature.

Specifically, at 316 and 320, the controller may estimate a combustion heat flow into the direct injector based on whether cylinder combustion is present or absent while the direct injector is deactivated. This heat flow represents the heating power transferred from the combustion chamber to the direct injector tip. The combustion heat flow transferred depends on whether the cylinder is fueled and sparked. The direct injector tip temperature is increased higher than the fuel temperature when cylinder combustion is present, the direct injector tip temperature decreased lower than the fuel temperature when cylinder combustion is absent.

When cylinder combustion is absent, a heat flow into the direct injector may be estimated at 320 as a function of engine speed, average cylinder load, and cylinder head temperature (CHT). The controller may refer a look-up table, algorithm, or model (such as the example model of FIG. 4) that uses engine speed, average cylinder load, and cylinder head temperature (CHT) as inputs and which provides a DI tip temperature (or an increase in DI tip temperature from a steady-state temperature) as the output. The controller may increase the DI tip temperature as the engine speed increases, as the average cylinder load increases, and/or as the sensed CHT increases.

When cylinder combustion is present, a heat flow into the direct injector may be estimated at 316 as a function of engine speed, average cylinder load, cylinder head temperature (CHT) and spark timing. The controller may refer a look-up table, algorithm, or model (such as the example model of FIG. 4) that uses engine speed, average cylinder load, cylinder head temperature (CHT), and spark timing as inputs and which provides a DI tip temperature (or an increase in DI tip temperature from a steady-state temperature) as the output. The controller may increase the DI tip temperature as the engine speed increases, as the average cylinder load increases, as the sensed CHT increases, and/or as spark timing is retarded from MBT. The increase in the direct injector tip temperature may be raised relative to the increase in the fuel temperature as the average cylinder load increases. In addition, the heat flow may be based on a cylinder combustion air-fuel ratio when combustion is present. For example, when the actual injector tip temperature is hotter than the estimated tip temperature, less fuel may be injected than commanded, resulting in a leaner fuel-air ratio than intended. The heat flow into the injector may alternatively be determined as a function of the difference in steady state injector tip temperature (computed at 320 when combustion is absent) and the combustion induced injector tip temperature (computed at 316 when combustion is present).

The injector tip temperature estimate is further based on whether port injection is activated (and the cylinder is combusting) or deactivated (and the cylinder is not combusting) while the direct injector is deactivated. The direct injector tip temperature is increased higher than the fuel temperature when port injection is activated. The direct injector tip temperature is decreased lower than the fuel temperature when port injection is deactivated. In another example, the baseline engine system is a DI engine. When the engine does not combust, the DI injectors have reduced heat flow rate and they cool. When the DI injectors do not flow fuel, the DI injector tip cooling is reduced and the DI injector tip temperature increases.

Next, at 318 and 322, the controller may estimate a cooling flow into the direct injector due to injector fuel replenishment. The cooling flow into the direct injector may be determined as a function of the sensed or modeled fuel rail temperature (FRT) (e.g., as sensed via a fuel rail temperature sensor), and further based on fuel flow rate (into the direct injector). The fuel flow rate may be determined by the controller because the engine controller injects a known fuel volume into the cylinder. When this injected mass is multiplied by the number of injection events per unit time (proportional to engine speed), it yields volume flow rate. The cooling flow may be increased as the flow rate of cooler fuel entering the injector tip increases, and as the temperature of the fuel in the fuel rail drops.

It will be appreciated that while the above model describes two heat sources/sinks, namely fuel flow rate and combustion heat, this is not meant to be limiting and addition heat sources and sinks (e.g., air flow, etc.) may be included in the injector tip temperature model. From 318, the method moves directly to 328.

If the cylinder is not combusting, from 322, the method moves to 324 where it may be further determined if there is cooling flow due to cylinder valves operating while the cylinder is not combusting. Thus at 324 it may be determined if the valves are active. In one example, during a DFSO, cylinder fueling may be selectively deactivated while one or more cylinder valves (e.g., at least one intake and one exhaust valve) continue to operate and pump air through the cylinder. In still other examples, during a DFSO, both cylinder fueling and valve operation may be selectively deactivated. The controller may estimate the direct injector tip temperature different from the fuel temperature based on whether cylinder valve operation is activated or deactivated while the direct injector is deactivated. If valve operation is present, at 326, the controller may update (e.g., increase) the net cooling flow into the direct injector based on air flow through the cylinder via the cylinder valves while the direct injector is deactivated. The direct injector tip temperature may be decreased more than the fuel temperature when cylinder valve operation is activated, and the direct injector tip temperature may be increased more than the fuel temperature when cylinder valve operation is deactivated. The method then moves to 328. If valve operation for cylinder deactivation is not present, the method moves to 328 directly.

At 328, the method includes estimating a net heat transferred to the direct injector based on the (combustion) heat flow relative to the (fuel replenishment) cooling flow. In one example, the net heat transfer may be determined as:

Net heating power=heating power from combustion chamber to injector tip−cooling power due to cool fuel entering the injector tip.

It will be appreciated that in examples where the controller's algorithm automatically assigns the heat transfer from the fuel flow a negative sign to account for cooling and assigns the heat transfer from combustion a positive sign to account for heating, the net heating power may be learned as a sum of the heat transfer from the fuel flow and the heat transfer from the combustion.

It will be appreciated that the direct injector tip temperature may be further estimated differently from the fuel temperature based on a duration of direct injector deactivation. The tip temperature may rise faster and by a higher degree than the fuel temperature over the duration of direct injector deactivation. In particular, during transients, the fuel rail temperature may remain relatively stable due to its large volume (40 to 60 ml relative to a 0.02 to 0.5 ml injection event).

At 330, the method includes estimating a fuel density based on each of the estimated DI tip temperature and the estimated fuel temperature. The controller may use a look-up table or algorithm that uses the modeled DI tip temperature as the input and the fuel density (or a change in the fuel density from a nominal density) as the output. As the DI tip temperature increases over a steady-state temperature, the estimated fuel density may decrease. In one example model, tip temperature change is inversely proportional to fuel density change in the injector tip.

At 332, it may be determined if DI reactivation conditions have been met. DI reactivation conditions may be considered met responsive to, as non-limiting examples, the end of a DFSO event, increase in operator torque demand, tip temperature reaching an upper limit, etc. If DI reactivation conditions are not met, at 334, the method includes continuing to monitor heat flow and cooling flow to the direct injector and accordingly updating an estimated of the DI tip temperature and the fuel density.

If DI reactivation conditions are met, then at 336, the method includes adjusting one or more of a direct injection fuel pulse and a port injection fuel pulse based on each of the estimated direct injector tip temperature and fuel temperature. The powertrain control module (PCM) of the engine controller may calculate an initial fuel pulse width for the direct injector based on engine operating conditions at reactivation of the direct injector, and then update the initial fuel pulse width based on the estimated fuel density. As an example, the initial fuel pulse width for the direct injector may be increased as the estimated fuel density drops below a nominal fuel density (due to a rise in the tip temperature or fuel temperature), and the initial fuel pulse width for the direct injector may be decreased as the estimated fuel density drops exceeds the nominal fuel density (due to a drop in the tip temperature or fuel temperature). The port injection fuel pulse width may be adjusted based on the change in the direct injection fuel pulse width to maintain a combustion air-fuel ratio.

At 338, the updated fuel pulse widths may be commanded to the respective direct and/or port fuel injectors. In this way, the initial settings of at least the DI fuel pulse may be adjusted to compensate for the fuel density change due to the DI tip temperature variation. For example, a control signal corresponding to the updated DI fuel pulse width may be sent from the controller to an actuator coupled to the DI fuel injector to deliver fuel from the DI injector in accordance with the updated pulse-width. The routine then exits.

In an alternate example, the controller may determine a first correction factor to be applied to the fuel density estimated based on the predicted rise in fuel temperature over the preceding period of DI deactivation relative to the predicted drop in fuel temperature at the time of reactivation due to fuel flow. Likewise, a second correction factor may be determined based on the predicted rise in injector tip temperature over the preceding period of DI deactivation relative to the predicted drop in injector tip temperature at the time of reactivation due to fuel flow. By applying each of the first and second correction factor, a net change in the fuel temperature on each DI pulse following reactivation may be determined, and a corresponding change in fuel density may be estimated. By applying each of the first and second correction factor to the initially determined DI fuel pulse, an updated DI fuel pulse profile may be determined which compensates for the temperature-dependent change in fuel density. As such, if the fuel density change were estimated based on only the estimated rise in fuel temperature during the preceding DI deactivation, without accounting for the predicted drop in fuel temperature due to the rapid drop in injector tip temperature following the flow of fuel through the DI injector, the estimated fuel density may be underestimated and overcompensated for, resulting in a richer than intended injection.

Updating the DI fuel pulse with the correction factors may include adjusting one or more injection parameters such as a pulse width of the DI injection, an injection pressure, and an injection amount. In one particular example, on a first pulse following the DI reactivation, a pulse-width of the direct injection may be increased over the initial fuel pulse-width, and over subsequent pulses, the pulse-width of the direct injection may be gradually decreased towards the initial fuel pulse-width. As such, the pulse-width adjustments (including a magnitude of the adjustment and a rate of the adjustment) may be performed on a fueling event-by-fueling event basis taking into the account the change in fuel temperature due to the fuel conditions and the DI injector conditions on each fueling event. For example, the adjustments may take into the account the change in fuel density due to the slower rise in fuel temperature during the period of DI deactivation and the slower drop in fuel temperature following the reactivation, as well as the faster rise in injector tip temperature during the period of DI deactivation and the faster drop in injector tip temperature following the reactivation. Thus, the increase in pulse-width on the first pulse following the DI reactivation may be larger than the decrease in pulse-width on the subsequent DI fuel pulses. In still other example, the updated fuel system temperature may be fed into a DI slope correction calculation to compensate for the change in fuel density with fuel system temperature.

It will be appreciated that while the routine of FIG. 3 describes a DI fuel pulse adjustment for when DI is reactivated following a period of engine fueling via port injection only, in alternate examples, the same routine may be used to predict fuel density changes when a DI only fuel system is reactivated after a duration of deactivation. For example, DI injector tip temperature changes resulting from valve stem temperature changes over a duration of DI deactivation in a DI-only fuel system may be learned and used to compensate DI fuel pulses when DI fueling is reactivated. This allows lambda drifts resulting from the fuel system temperature change to be reduced.

Figure 4:
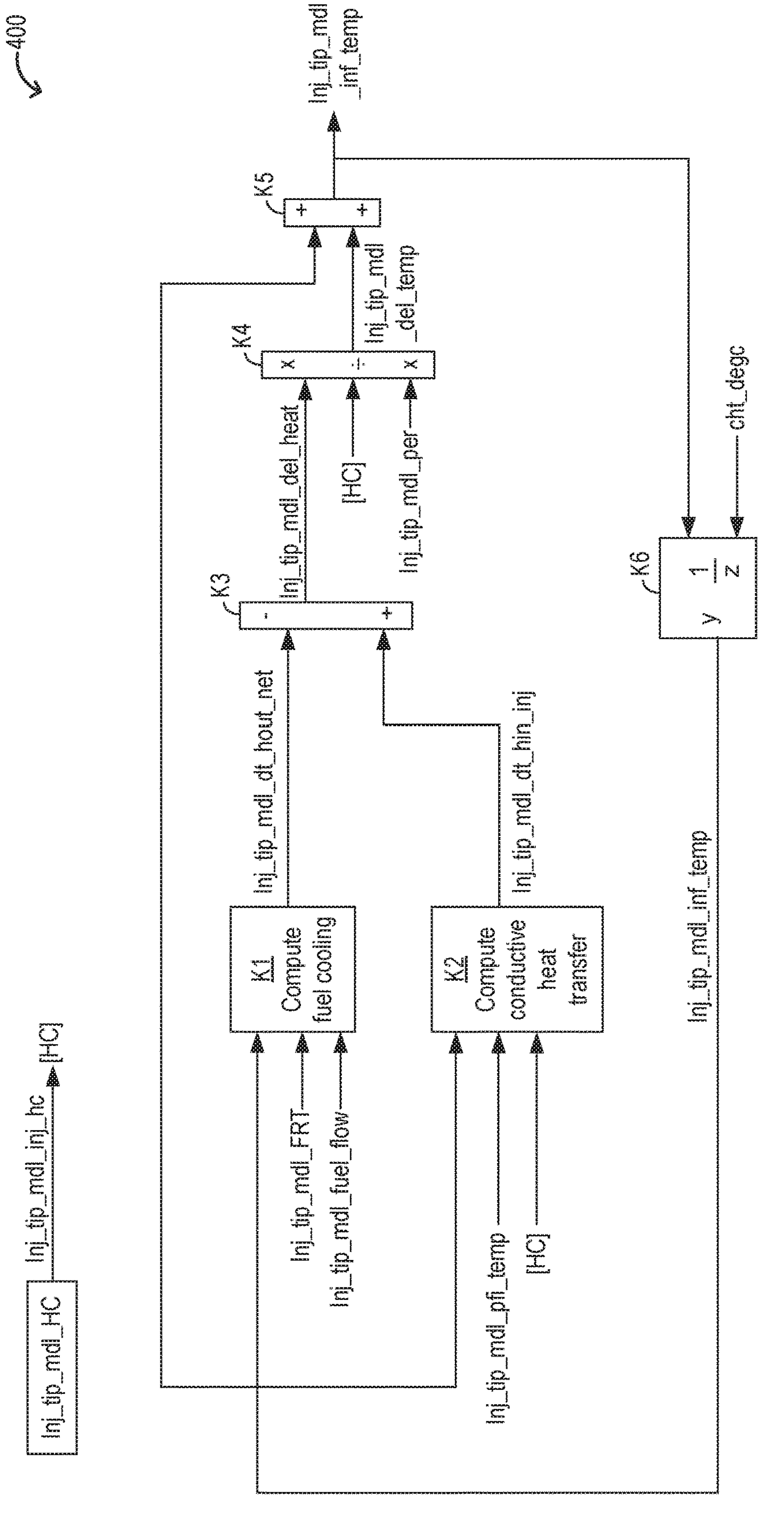
FIG. 4 shows an example model that may be used by an engine controller to estimate a change in DI fuel system temperature over a duration of DI deactivation, and at a time of DI reactivation.

An example model or algorithm that may be used by the controller to estimate the heat transfer and heat loss from the injector tip, and the resulting change in the fuel temperature at the time of (and following) DI reactivation is shown with reference to FIG. 4. Therein, map 400 depicts an example model for inferring a modeled direct injector tip temperature (inj_tip_mdl_inf_temp).

The heat capacity of the lumped thermal mass that represents the injector tip (Inj_tip_mdl_inj_hc) is used to determine a heat capacity value (HC). The heat capacity has units of joules/Celsius degree. It has dimensions of energy/delta Temperature.

Cooling of the direct injector tip from fuel flow is determined by controller K1 as a function of the inferred or measured temperature of the fuel in the fuel rail which cools the injector tip when the DI injectors are active (Inj_tip_mdl_frt, which has units of degrees Celsius, and dimension of temperature), fuel flow rate through one DI injector (Inj_tip_mdl_di_fuel_flow, which has units of g/s, and dimensions of mass/time), and a modeled version of the injector tip temperature, corresponding to one time step in past (Inj_tip_mdl_inf_temp). The output of controller K1 is a heat flow rate from fuel to the direct injector tip (Inj_tip_mdl_dt_bout_net, which has units of watts, and dimension of power).

Controller K2 computes the conductive heat transfer to the direct injector tip as a function of the modeled version of the injector tip temperature, corresponding to one time step in past (Inj_tip_mdl_inf_temp), the mean effective temperature produced by the combustion process that conducts heat to the injector tip through a fixed thermal resistance (Inj_tip_mdl_pfi_temp), and the heat capacity of the injector (HC). The output of controller K2 is a heat flow rate from the combustion chamber to the injector tip (Inj_tip_mdl_dt_hin_ inj, having units of watts, and dimension of power).

The heat flow rate from the combustion chamber and the heat from rate from the fuel to the direct injector tip are then input to controller K3 (e.g., a comparator) which calculates the net heat flow rate to injector tip (Inj_tip_mdl_del_heat, which has units of watts, and dimension of power). Next, controller K4 (e.g., multiplier) uses the calculated net heat flow rate, in addition to the heat capacity of the direct injector (HC) and the time period over which this discrete time model executes (Inj_tip_mdl_per, having units of seconds, and dimension of delta time) to calculate the injector tip temperature change over the time period (Inj_tip_mdl_del_temp, having units of degrees Celsius). In one example, the model executes every 0.1 second period.

The tip temperature change is used by controller K5 (e.g., an adder) in association with the modeled version of the injector tip temperature, corresponding to one time step in past (Inj_tip_mdl_inf_temp) to provide a current estimate of the injector tip temperature (Inj_tip_mdl_inf_temp, having units of Celsius degrees, and dimension of temperature). Controller K6 is used to introduce a delay so as to provide the modeled version of the injector tip temperature, corresponding to one time step in past. The modeled version of the injector tip temperature is then updated for the next iteration of the routine based on the current estimate of the injector tip temperature. On the first iteration of the routine, when no previous estimate of the injector tip temperature is available, the routine is initialized using the cylinder head temperature (cht_degc, having units in degrees Celsius). Thereafter, the injector tip temperature model is primed on each iteration of the routine with the updated modeled injector tip temperature. In this way, the injector tip temperature may be better estimated and tip temperature induced fuel density changes can be better accounted for.

Figure 6:
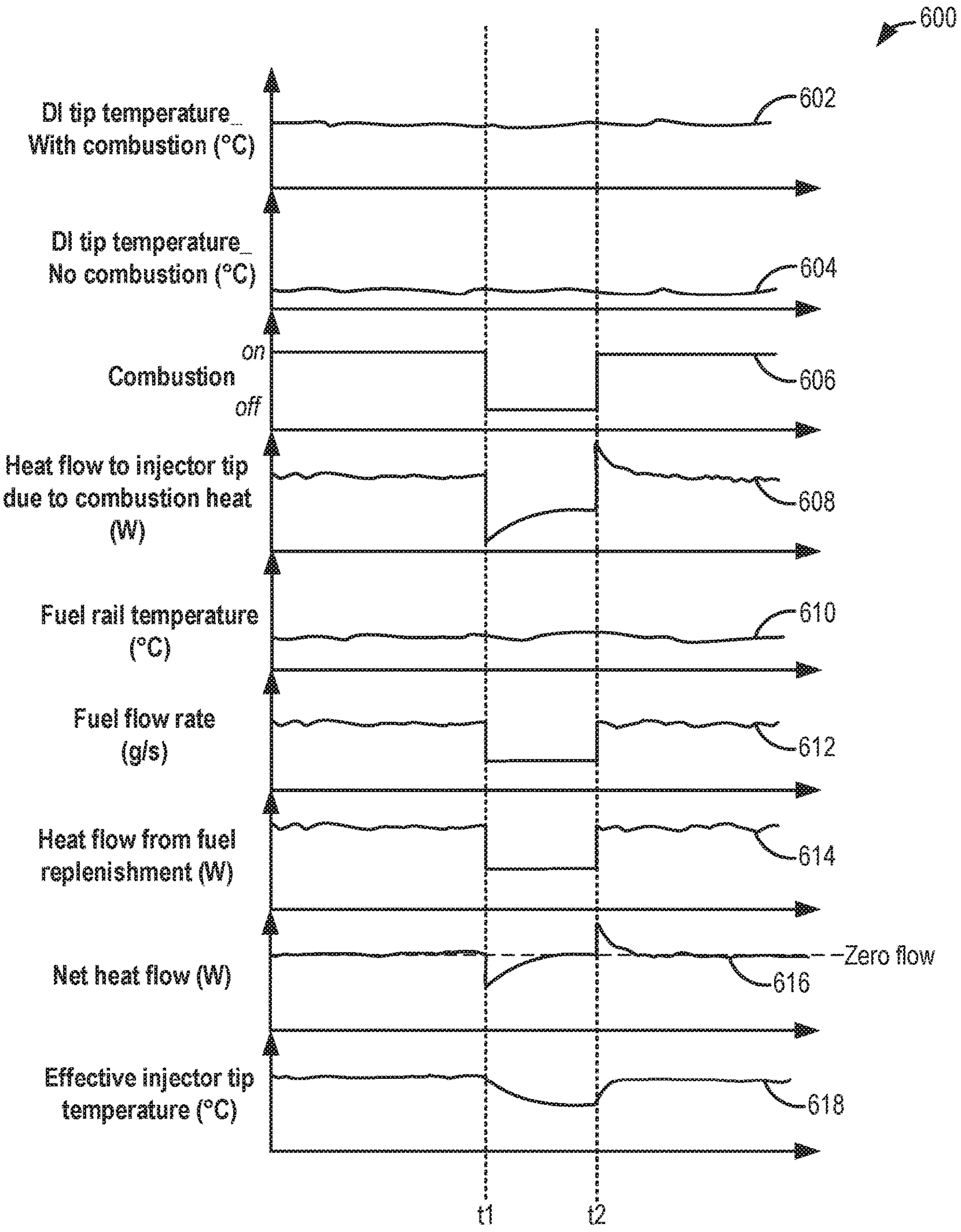
FIG. 6 shows an example plot of inferring a direct injector tip temperature based on heat flow and cooling flow to the injector during engine combusting and non-combusting conditions.

Turning now to FIG. 6, map 600 shows an example learning of an effective direct injector tip temperature. The map continuously monitors a change in the tip temperature over a duration of engine operation by comparing changes in heat flow and cooling flow to the direct injector with and without cylinder combustion.

In the depicted example, cylinder combustion occurs between t0 and t1, and after t2. Between t1 and t2, all cylinder combustion is temporarily disabled. For example, a DFSO event may occur between t1 and t2.

Plot 602 depicts the mapping of a DI tip temperature when cylinder combustion is present. This includes when cylinder combustion following fueling via direct and/or port injection is present. Plot 604 depicts the mapping of a DI tip temperature when cylinder combustion is absent. Plot 606 depicts times when cylinder combustion is present or absent. By using plots 602-606, the controller may compute a resulting heat flow to the direct injector tip due to heat of combustion, as shown at plot 608. The heat flow from combustion drops during times when cylinder combustion is not present (between t1 and t2).

Fuel rail temperature over the same period is shown at plot 610. As such, the fuel rail temperature is indicative of the fuel temperature, which remains stable even as cylinder combustion is turned off and on. The fuel flow rate into the injector is shown at plot 612. The flow rate drops when combustion is disabled and rises when combustion is enabled. When fuel flow is disabled due to combustion being disabled, the heat flow from replenishment immediately drops and there is no heat flow to the injector tip. When combustion is disabled, there is also an immediate drop in the combustion heat flow to the direct injector, however, due to the presence of lingering heat in the cylinder, there continues to some combustion heat that is transferred to the injector tip. When fuel flow is resumed at t2 due to combustion being re-enabled, heat flow from fuel replenishment immediately resumes. Likewise, combustion heat flow also resumes when combustion is re-enabled. However, due to the sudden in-rush of combustion heat into the cylinder, there is a transient spike in the combustion heat flow. By using plots 610 and 614, the controller may compute a resulting heat transfer (or cooling flow) to the direct injector tip due to heat of fuel replenishment, as shown at plot 614.

A net heat flow into the injector, relative to zero flow (dashed line) is determined as a function (e.g., a sum) of the heat flow from combustion and the heat of fuel replenishment, as shown at plot 616 (that is, plot 616 is a sum of plots 614 and 608). In particular, the net heat flow drops sharply when combustion is disabled, but then rises gradually over the duration of direct injector deactivation with no cylinder combustion. The net flow then rises again sharply when combustion is re-enabled.

The injector tip effective temperature is then determined as a function of the net heat flow and a heat capacity of the injector tip, as shown at plot 618. The effective injector tip temperature drops over the period of deactivation with no cylinder combustion. When the direct injector is reactivated at the time of combustion reactivation, a fuel density estimate may be updated based on the instantaneous tip temperature.

Figure 7:
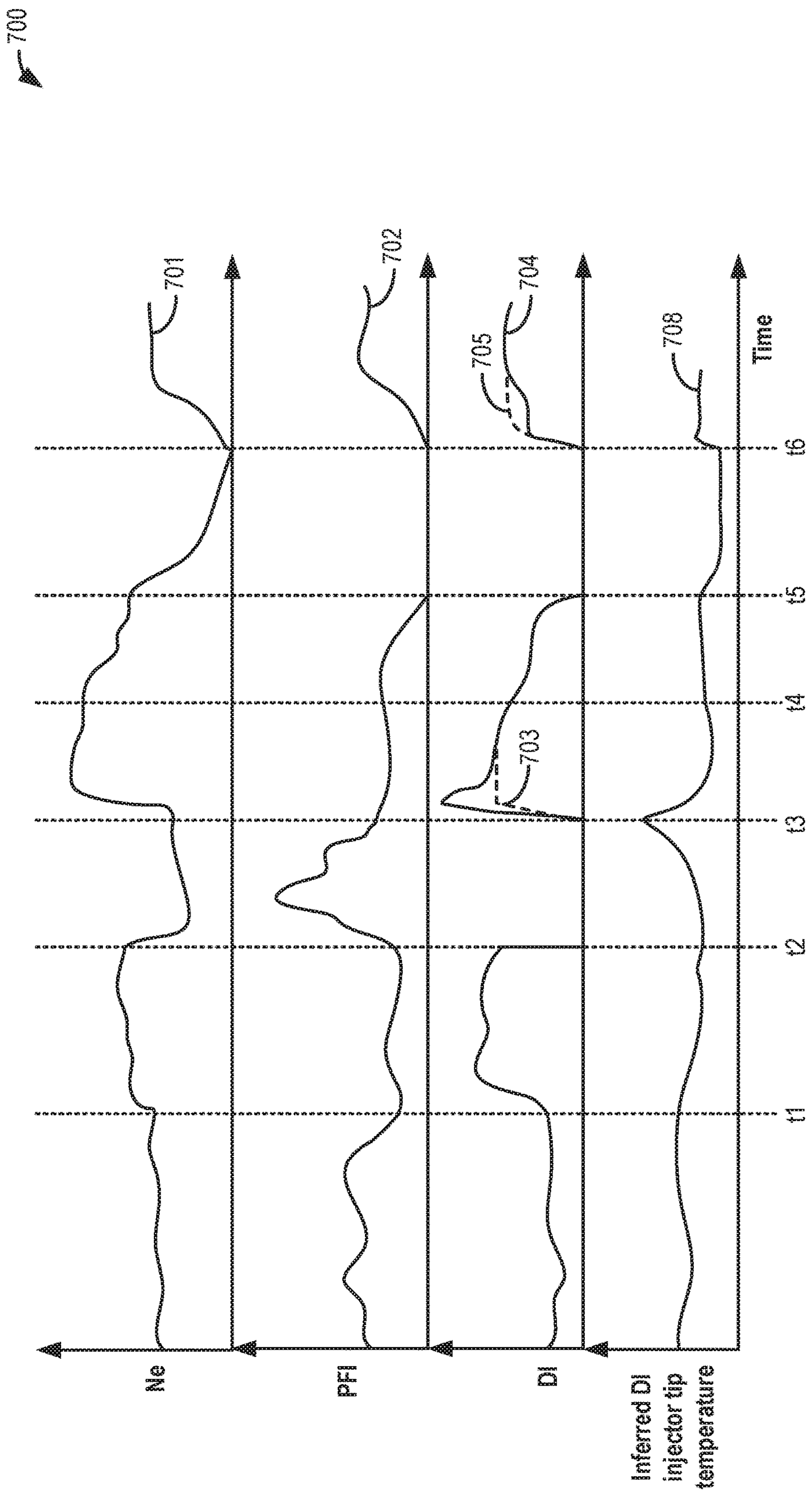
FIG. 7 shows an example plot of direct injection and port injection fuel pulse-width compensation, according to the present disclosure.

An example fuel pulse width adjustment is shown at FIG. 7. Map 700 depicts fueling of a cylinder via port injection at plot 702 and fueling of the same cylinder via direct injection at plot 704. The inferred direct injector tip temperature is continuously estimated and monitored, and depicted at plot 708. Engine speed is depicted at plot 701.

In the depicted example, prior to t1, based on engine operating conditions (e.g., mid-engine speed-load region), the engine cylinder may be receiving fuel via each of direct and port injection (plots 702, 704) with a ratio of the injections adjusted based on engine conditions to maintain an exhaust at stoichiometry. That is, both the port and direct injectors may be activated. The inferred DI injector tip temperature is estimated at this time based on the higher heat flow transferred to the injector tip due to cylinder combustion relative to the lower cooling flow transferred to the injector tip due to fuel flow through the injector nozzle. During combustion, the inferred DI injector tip temperature stabilizes to a steady-state temperature.

At t1, there is an increase in driver demand, the engine moves to a higher speed-load region where there is a higher likelihood of knock. In response to the increase in driver demand, an amount of fuel that is direct injected into the cylinder via the direct injector is increased while the amount of fuel that is port injected into the cylinder via the port injector is correspondingly decreased to maintain the combustion air-fuel ratio at stoichiometry. At this time, the inferred DI injector tip temperature continues to be estimated. There is a slight drop in the temperature due to an increase in the cooling flow transferred to the injector tip as a result of the increase in fuel flow through the direct injector nozzle. The inferred temperature is substantially at or around the steady-state temperature and therefore the fuel density remains substantially at or around a nominal density. Therefore the DI fuel pulse-width does not need to be adjusted to compensate for the temperature change.

At t2, due to a change in engine operating conditions (e.g., change in engine speed and load conditions to a lower speed-load region), direct injection of fuel is disabled. For example, the engine may be operating at low loads where knocking is infrequent and wherein port injection provides higher engine performance benefits. At t2, the port injector remains activated and cylinder combustion continues with port injected fuel while the direct injector is idled or deactivated. The direct injector may remain deactivated or idle for a duration between t2 and t3.

The inferred DI injector tip temperature continues to be estimated while the direct injector is disabled. There is a gradual rise in the tip temperature due to a net heat flow into the injector tip. The net heat flow is due to combustion heat continuing to flow from the cylinder combustion into the injector tip while the cooling flow transferred to the injector tip decreases as a result of the drop in fuel flow through the direct injector nozzle. The inferred temperature gradually rises above the steady-state temperature and therefore the fuel density starts to drop relative to the nominal density.

At t3, there is a further change in engine speed-load to mid-to-high engine speed-load conditions. At this time, direct injection of fuel is reactivated to increase charge cooling benefits. An initial fuel pulse-width (shown at dashed segment 703) is determined based on the engine operating conditions. However, due to the rise in injector tip temperature over the duration while the direct injector was deactivated but cylinder combustion continued (between t2 and t3), the density of fuel being released by the direct injector drops. If fuel is direct injected according to the initially determined fuel pulse-width 703 without compensating for the temperature-induced change in fuel density, the fuel mass released would be lower than intended, resulting in a lean air-fuel ratio error. To address this, at t3, the direct injection pulse-width is adjusted, herein increased, by an amount that is based on the inferred injector tip temperature. In particular, the direct injection pulse-width is increased by an amount that is a function of the increase in tip temperature over the steady-state injector tip temperature. The increased pulse-width includes a larger and longer pulse width than the initial pulse-width. In addition, a port injection fuel pulse-width is adjusted, herein decreased. As such, the Fuel pulse-with may change continuously based on the quantity of fuel that the controller intends to inject. However, this base pulse-width is adjusted based on the fuel density at the injector tip which varies as a function of modelled injector tip temperature.

The pulse width of direct injection of fuel from the direct injector into the engine cylinder is temporarily increased based on the direct injector being previously deactivated but cylinder combustion continuing. For example, the direct injection at the increased pulse width may be continued from t3 for a number of engine cycles until the inferred DI tip temperature returns to a steady-state temperature, at t4, after which the increasing may be terminated and a nominal determined fuel pulse-width based on the engine speed-load conditions while operating with a nominal fuel density at the steady-state tip temperature is resumed.

Between t4 and t5, fuel that is direct injected into the cylinder via the direct injector and fuel is port injected into the cylinder via the port injector, the respective amounts selected based on the engine speed-load conditions and driver torque demand. The inferred DI injector tip temperature continues to be estimated. There is a slight drop in the temperature due to an increase in the cooling flow transferred to the injector tip as a result of fuel flow through the direct injector nozzle.

At t5, due to a change in engine operating conditions (e.g., drop in driver torque demand), a DFSO event is confirmed and all cylinder fueling (including fueling via direct injection and port injection) is disabled. The engine starts to spin down. The direct injector and port injector remain deactivated or idle for a duration between t5 and t6. Between t5 and t6, while cylinder fueling is disabled, cylinder valve operation is not disabled, and the cylinder continues to have air pumped through the intake and exhaust valves. This increases the cooling flow to the direct injector while decreasing the combustion heat transferred to the direct injector. The inferred DI injector tip temperature continues to be estimated while the direct injector and the port injector are disabled. There is a gradual drop in the tip temperature due to a net cooling flow into the injector tip. (Said another way, the combustion temperature is lower than current tip temperature, fuel cooling is zero, and the tip temperature is cooling off toward the combustion temperature.) The net cooling flow is due to reduced combustion heat flowing from the cylinder combustion into the injector tip and increased cooling flow transferred to the injector tip as a result of the cylinder valve operation and fuel flow through the direct injector nozzle. The inferred temperature gradually drops below above the steady-state temperature and therefore the fuel density starts to increase relative to the nominal density.

At t6, DFSO conditions are discontinued and there is a change in engine speed-load conditions to mid-to-high engine speed-load conditions. At this time, cylinder fueling is resumed. Direct injection and port injection of fuel is reactivated. An initial fuel pulse-width (shown at dashed segment 705) is determined based on the engine operating conditions. However, due to the drop in injector tip temperature over the duration while the direct injector and port injector were deactivated and cylinder combustion stopped but cylinder valve operation continued (between t2 and t3), the density of fuel being released by the direct injector rises. If fuel is direct injected according to the initially determined fuel pulse-width 705 without compensating for the temperature-induced change in fuel density, the fuel mass released would be higher than intended, resulting in a rich air-fuel ratio error. To address this, at t6, the direct injection pulse-width is adjusted, herein decreased, by an amount that is based on the inferred injector tip temperature. In particular, the direct injection pulse-width is decreased by an amount that is a function of the decrease in tip temperature over the steady-state injector tip temperature. The decreased pulse-width includes a smaller and shorter pulse width than the initial pulse-width. In addition, a port injection fuel pulse-width is adjusted, herein increased. In one example, if the tip temperature is colder than the steady state value, the open loop fueling may tend to over fuel, resulting in a rich error (if not compensated for temperature). If the real tip temperature is higher than the assumed tip temperature, it can cause a lean error.

The pulse width of direct injection of fuel from the direct injector into the engine cylinder is temporarily decreased based on the direct injector being previously deactivated and cylinder combustion being stopped. For example, the direct injection at the decreased pulse width may be continued from t6 for a number of engine cycles until the inferred DI tip temperature returns to a steady-state temperature, after which the decreasing may be terminated and a nominal determined fuel pulse-width based on the engine speed-load conditions while operating with a nominal fuel density at the steady-state tip temperature is resumed.

It will be appreciated that if cylinder valve operation was also discontinued during the deactivation of fueling at t5-t6, the inferred direct injector tip temperature may have risen over the steady-state temperature (or decreased by a smaller amount). This would be due to the higher heat flow and the lower cooling flow resulting in a net heating of the injector tip. Consequently, upon reactivation at t6, the direct injection pulse width would have been increased for a number of engine cycles until the inferred DI tip temperature returned to the steady-state temperature, after which the increasing would be terminated and a nominal determined fuel pulse-width based on the engine speed-load conditions would be resumed. In this way, the fuel density is continuously updated based on the continuously updated tip temperature, and a direct injection fuel pulse-width is accordingly adjusted to compensate for the change in fuel density.

In this way, a temperature induced change in fuel density at a time of release from a previously deactivated direct injector can be better accounted for. By continuously estimating the heat flow to the direct injector in the presence and absence of cylinder combustion, based on combustion heat transfer, cylinder valve operation, port injector operation, cylinder load changes, etc., changes to the DI injector tip temperature may be more accurately monitored. By adjusting the settings of a direct injection fuel pulse based on the instantaneous direct injector tip temperature, changes in the fuel density due to the temperature can be better determined and compensated for, thereby reducing unintended air-fuel excursions. In addition, the charge cooling effect of the direct injection can be better leveraged. In addition, injector fouling and thermal degradation can be reduced.

One example method comprises estimating a direct injector tip temperature different from fuel temperature based on cylinder conditions including cylinder combustion conditions and cylinder valve operation; and responsive to deactivation or reactivation of a direct injector, adjusting one or more of a direct injection fuel pulse and a port injection fuel pulse based on each of the estimated direct injector tip temperature and fuel temperature. In the preceding example, additionally or optionally, estimating based on cylinder combustion conditions includes estimating based on whether cylinder combustion is present or absent while the direct injector is deactivated, the direct injector tip temperature increased higher than the fuel temperature when cylinder combustion is present, the direct injector tip temperature decreased lower than the fuel temperature when cylinder combustion is absent. In any or all of the preceding examples, additionally or optionally, an increase in the direct injector tip temperature is raised relative to an increase in the fuel temperature as an average cylinder load increases when cylinder combustion is present. In any or all of the preceding examples, additionally or optionally, an increase in the direct injector tip temperature is raised relative to an increase in the fuel temperature as cylinder combustion air-fuel ratio becomes leaner than stoichiometry when cylinder combustion is present. In any or all of the preceding examples, additionally or optionally, estimating based on cylinder valve operation includes estimating based on whether cylinder valve operation is activated or deactivated while the direct injector is deactivated, the direct injector tip temperature decreased more than the fuel temperature when cylinder valve operation is activated, the direct injector tip temperature increased more than the fuel temperature when cylinder valve operation is deactivated. In any or all of the preceding examples, additionally or optionally, the estimating is further based on whether port injection is activated or deactivated while the direct injector is deactivated, the direct injector tip temperature increased higher than the fuel temperature when port injection is activated, the direct injector tip temperature decreased lower than the fuel temperature when port injection is deactivated. In any or all of the preceding examples, additionally or optionally, the method further comprises adjusting the estimated direct injector tip temperature differently from the fuel temperature based on a duration of direct injector deactivation. In any or all of the preceding examples, additionally or optionally, adjusting the direct injection fuel pulse includes: estimating a fuel density based on each of the estimated direct injector tip temperature and the fuel temperature; calculating an initial fuel pulse width based on engine operating conditions at reactivation of the direct injector; and updating the initial fuel pulse width based on the estimated fuel density. In any or all of the preceding examples, additionally or optionally, the initial fuel pulse width is increased as the estimated fuel density drops below a nominal fuel density, and is decreased as the estimated fuel density exceeds the nominal fuel density.

Another example method comprises comparing combustion heat flow relative to fuel replenishment cooling flow into a direct injector over a period of injector deactivation, the combustion heat flow based on cylinder conditions, the fuel replenishment cooling flow based on fuel flow rate and fuel rail temperature; and upon reactivation of the direct injector, adjusting a direct injection fuel pulse-width based on the comparing. In the preceding example, additionally or optionally, the combustion heat flow is increased responsive to one or more of cylinder combustion continuing via port fuel injection over the period of direct injector deactivation, increase in engine speed or load, increase in spark timing retard, increase in cylinder head temperature, and increase in the period of cylinder combustion with only port fuel injection, and wherein the combustion heat flow is decreased responsive to one or more of port fuel injection deactivation and cylinder valve deactivation over the period of direct injector deactivation, and increase in the period of direct injector deactivation with no cylinder combustion. In any or all of the preceding examples, additionally or optionally, the fuel replenishment cooling flow is increased responsive to one or more of decrease in the fuel rail temperature and increase in fuel flow rate to the direct injector. In any or all of the preceding examples, additionally or optionally, the adjusting includes updating an initial direct injector tip temperature estimated immediately before direct injector deactivation with a correction factor based on the comparing of the combustion heat flow to the fuel replenishment cooling flow, and further based on a direct injector tip thermal mass. In any or all of the preceding examples, additionally or optionally, the adjusting further includes: estimating a fuel density based on the updated direct injector tip temperature; and adjusting an initial direct injection fuel pulse-width based on the estimated fuel density relative to a nominal fuel density, the initial direct injection fuel pulse-width based on engine operating conditions at reactivation of the direct injector. In any or all of the preceding examples, additionally or optionally, the initial direct injection fuel pulse-width is further based on an indication of engine knock, the indication including detection of knock via a knock sensor, or anticipation of knock based on the engine operating conditions. In any or all of the preceding examples, additionally or optionally, the adjusting includes increasing an initial direct injection fuel pulse-width as the combustion heat flow exceeds the fuel replenishment cooling flow, and decreasing the initial direct injection fuel pulse-width as the fuel replenishment cooling flow exceeds the combustion heat flow, the initial direct injection fuel pulse-width based on engine operating conditions at reactivation of the direct injector.

Another example method for an engine comprises: during a first condition, responsive to direct injector deactivation without combustion deactivation, increasing a direct injection fuel pulse-width at a time of direct injector reactivation; and during a second condition, responsive to direct injector deactivation with combustion deactivation, decreasing the direct injection fuel pulse-width at the time of direct injector reactivation. In the preceding example, additionally or optionally, during the first condition, a rate of the increasing is raised as one or more of engine speed, engine load, spark timing retard, estimated fuel rail temperature, and duration of engine fueling increases, and during the second condition, the decreasing is at a first rate when cylinder valves are deactivated and at a second rate when the cylinder valves are active, the second rate higher than the first rate. In any or all of the preceding examples, additionally or optionally, the method further comprises estimating a steady-state direct injector tip temperature different from a steady-state fuel temperature based on cylinder conditions before direct injector deactivation; and estimating a transient direct injector tip temperature based on the steady-state direct injector tip temperature, the steady-state fuel temperature, and cylinder conditions after direct injector deactivation, wherein during the first condition, the increasing is based on the steady-state direct injector tip temperature relative to the transient direct injector tip temperature, and during the second condition, the decreasing is based on the steady-state direct injector tip temperature relative to the transient direct injector tip temperature. In any or all of the preceding examples, additionally or optionally, the method further comprises during each of the first and the second condition, adjusting a port injection fuel pulse-width at the time of direct injector reactivation.

In a further representation, an engine method includes calculating a direct injector tip temperature based on a sum of combustion heat flow and fuel replenishment cooling flow to a direct injector over a period of injector deactivation, the combustion heat flow based on cylinder conditions, the fuel replenishment cooling flow based on fuel flow rate and fuel rail temperature; and adjusting a direct injection fuel pulse-width based on the calculated tip temperature upon reactivation of the direct injector. In the preceding example, additionally or optionally, the direct injection fuel pulse-width that is increased or decreased is a nominal fuel pulse-width based on each of engine speed, engine load, knock intensity, and a nominal fuel density. In any or all of the preceding examples, additionally or optionally, a rate of the decreasing is raised responsive to one or more of the intake and exhaust valve remaining active during the duration of no engine fueling, and an increase in the duration of no engine fueling. In any or all of the preceding examples, additionally or optionally, the method comprises estimating a direct injector tip temperature different from fuel temperature based on cylinder conditions including cylinder combustion conditions and cylinder valve operation; and responsive to deactivation or reactivation of a direct injector, adjusting one or more of a direct injection fuel pulse and a port injected fuel pulse based on each of the estimated direct injector tip temperature and fuel temperature.

In another further representation, an engine system comprises an engine cylinder including intake valve and an exhaust valve; a direct fuel injector for delivering fuel directly into the engine cylinder; a port fuel injector for delivering fuel into an intake port, upstream of the intake valve of the engine cylinder; a fuel rail providing fuel to each of the direct and port fuel injector; a temperature sensor coupled to the fuel rail; and a controller. The controller is configured with computer readable instructions stored on non-transitory memory for: deactivating the direct fuel injector; in response to direct injector reactivation after a duration of engine fueling via port injection only, increasing a commanded direct injection fuel pulse-width; and in response to direct injector reactivation after a duration of no engine fueling, decreasing the commanded direct injection fuel pulse-width. In the preceding example, additionally or optionally, a rate of the increasing is raised as one or more of engine speed, engine load, spark timing retard, estimated fuel rail temperature, and duration of engine fueling increases. In any or all of the preceding examples, additionally or optionally, a rate of the decreasing is raised responsive to one or more of the intake and exhaust valve remaining active during the duration of no engine fueling, and an increase in the duration of no engine fueling. In any or all of the preceding examples, additionally or optionally, the controller includes further instructions for: estimating a fuel flow rate into the deactivated direct injector; and as the estimated fuel flow rate increases, reducing the rate of increasing in response to direct injector reactivation after the duration of engine fueling via port injection only; and raising the rate of decreasing in response to direct injector reactivation after the duration of no engine fueling.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:

estimating a direct injector tip temperature different from fuel temperature based on cylinder conditions including cylinder combustion conditions and cylinder valve operation; and responsive to deactivation or reactivation of a direct injector, adjusting one or more of a direct injection fuel pulse and a port injection fuel pulse based on each of the estimated direct injector tip temperature and fuel temperature.

2. The method of claim 1, wherein estimating based on cylinder combustion conditions includes estimating based on whether cylinder combustion is present or absent while the direct injector is deactivated, the direct injector tip temperature increased higher than the fuel temperature when cylinder combustion is present, the direct injector tip temperature decreased lower than the fuel temperature when cylinder combustion is absent.

3. The method of claim 2, wherein an increase in the direct injector tip temperature is raised relative to an increase in the fuel temperature as an average cylinder load increases when cylinder combustion is present.

4. The method of claim 2, wherein an increase in the direct injector tip temperature is raised relative to an increase in the fuel temperature as cylinder combustion air-fuel ratio becomes leaner than stoichiometry when cylinder combustion is present.

5. The method of claim 1, wherein estimating based on cylinder valve operation includes estimating based on whether cylinder valve operation is activated or deactivated while the direct injector is deactivated, the direct injector tip temperature decreased more than the fuel temperature when cylinder valve operation is activated, the direct injector tip temperature increased more than the fuel temperature when cylinder valve operation is deactivated.

6. The method of claim 5, wherein the estimating is further based on whether port injection is activated or deactivated while the direct injector is deactivated, the direct injector tip temperature increased higher than the fuel temperature when port injection is activated, the direct injector tip temperature decreased lower than the fuel temperature when port injection is deactivated.

7. The method of claim 1, further comprising adjusting the estimated direct injector tip temperature differently from the fuel temperature based on a duration of direct injector deactivation.

8. The method of claim 1, wherein adjusting the direct injection fuel pulse includes:

estimating a fuel density based on each of the estimated direct injector tip temperature and the fuel temperature;

calculating an initial fuel pulse width based on engine operating conditions at reactivation of the direct injector; and updating the initial fuel pulse width based on the estimated fuel density.

9. The method of claim 8, wherein the initial fuel pulse width is increased as the estimated fuel density drops below a nominal fuel density, and is decreased as the estimated fuel density exceeds the nominal fuel density.

* * * * *